Aug. 14, 1928.
D. R. CAPES
BRAKE MECHANISM FOR VEHICLES
Filed Jan. 9, 1926
1,680,319
2 Sheets-Sheet 1
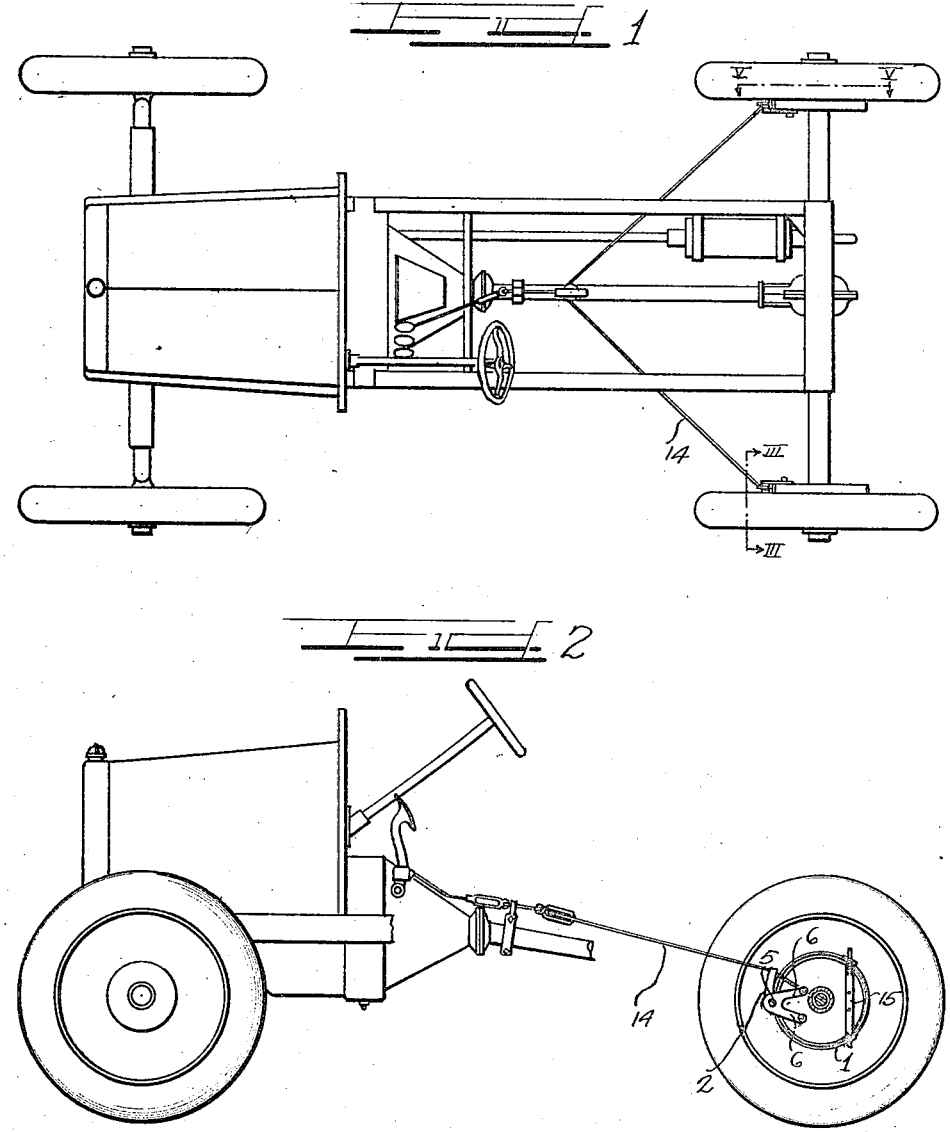
Inventor
Delbert R. Capes.

Aug. 14, 1928.
D. R. CAPES
1,680,319
BRAKE MECHANISM FOR VEHICLES
Filed Jan. 9, 1926   2 Sheets-Sheet 2
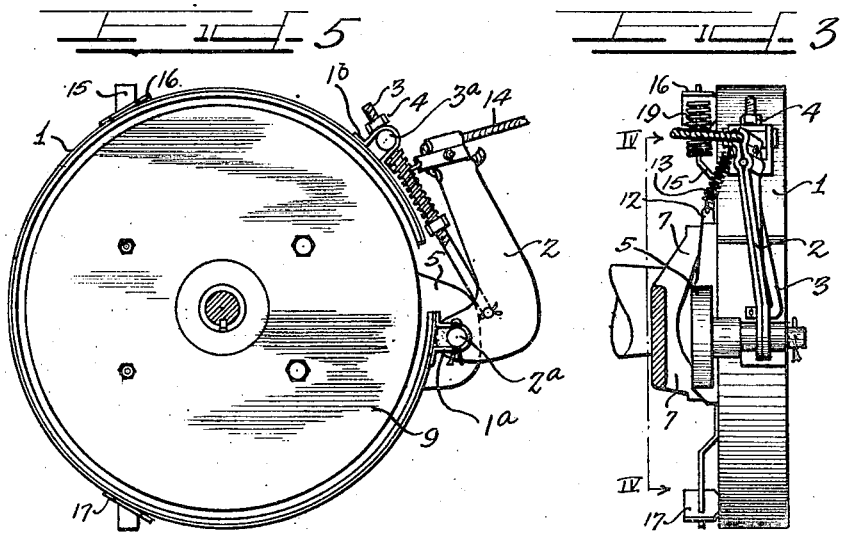
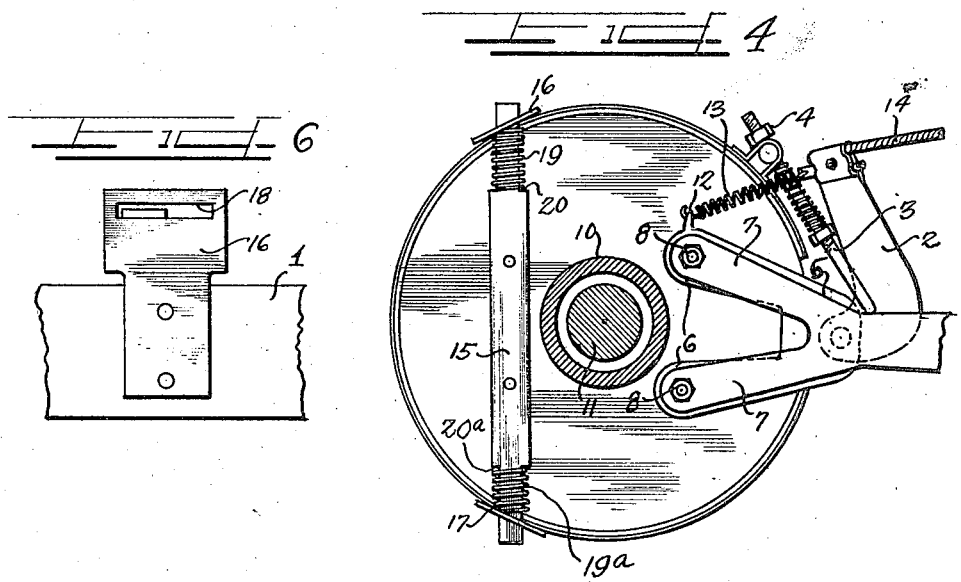
Inventor
Delbert R. Capes
By Charles... Atty Patented Aug. 14, 1928.

1,680,319

UNITED STATES PATENT OFFICE.

DELBERT R. CAPES, OF CHICAGO, ILLINOIS, ASSIGNOR TO A-C MANUFACTURING CO., INC., A CORPORATION OF ILLINOIS.

BRAKE MECHANISM FOR VEHICLES.

Application filed January 9, 1926. Serial No. 80,159.

This invention relates to brake mechanisms for vehicles and has for its object the provision of means for retaining the brake bands about the brake drums, mechanisms for operatively connecting said bands with their respective cables which are operatively connected with the brake lever, and means for supporting said mechanisms.

This invention further comprises the novel mechanism and combinations hereinafter described and more particularly pointed out and defined in the appended claims.

Other and further important objects of this invention will be apparent from the disclosures in the specification and accompanying drawings.

On the drawings;

Figure 1 is a top plan view of the chassis of an automobile of a Ford type having installed therein a device embodyng this invention.

Figure 2 is a side elevation thereof.

Figure 3 is an enlarged detail fragmentary elevational view with parts omitted showing one of the brake bands, a mechanism for operatively connecting said band with its respective operating cable and the means for supporting said mechanism, taken substantially along line III—III of Figure 1.

Figure 4 is a fragmentary sectional view with parts omitted taken at the line IV—IV of Figure 3.

Figure 5 is an enlarged fragmentary view with parts omitted taken at the line V—V of Figure 1.

Figure 6 is an enlarged fragmentary detail view with parts omitted of the mechanism for retaining the brake bands against lateral movement on the brake drums.

As shown on the drawings:

In referring to the different figures of the drawing it will be obvious that the brake drums connected for rotation with the rear wheels are equipped with brake bands 1, the ends of which are connected through brackets 1ª and 1ᵇ to a form of bell crank lever 2 and one end of a threaded rod 3 respectively. The threaded rod 3 is bent at the other end thereof, the bent portion entering the lever 2 and pinned in position therein so that pull upon the upper end of said lever will draw the ends of the band 1 together, thereby clamping the latter to the brake drum. A suitable nut 4 is provided on the end of the rod 3 beneath a crosshead pivot pin 3ª which is pivotally and slidably contained in the bracket 1ᵇ so that the tension on the band 1 may be varied. The lever 2 is pivotally mounted by means of a pin 2ª which is pivotally and slidably contained in the bracket 1ª, on the forwardly extending portion of a plate 5 which has integral therewith a pair of diverging legs 6. The plate 5 is mounted in juxtaposed relation with the rear end of the respective radius rod which in this case is also provided with diverging legs such as 7. Bolts 8 extend through the rear ends of the legs 6 and 7 and connect the same with the usual stationary disk or drum 9 on the housing 10 on the rear axle 11. The plate 5 has provided on the upper side of the upper leg 6 thereof a lug 12 to which is connected the rear end of a spring 13 the forward end of which is connected to the upper end of the lever 2 for normally holding the latter in rearward or inoperative position. The upper end of the lever 2 is operatively connected to one end of an equalizing cable 14 which is adapted to be operated by the brake pedal or the like as shown and described in my prior Patent No. 1,543,664 of June 30, 1925. The brake bands 1 which extend around the peripheries of their respective brake drums (not shown) are held against lateral movement on said brake drums by means of a vertical bar 15 which is rigidly secured to the disk 9 and which has the upper and lower ends thereof inwardly deflected and reduced in width. As shown in Figure 4 the brake bands 1 are each provided with two peripherally spaced plates 16 and 17. The plate 16 is positioned on the upper side of the brake band and has a longitudinal slot 18 (Fig. 6) therein adapted to receive the upper end of the bar 15. The plate 17 is similarly secured on the lower periphery of the brake band and is also provided with a slot similar to the slot 18 which slidably receives the lower end of the bar 15. Compressed springs 19 and 19ª surround the upper and lower portions of the bar 15 and engage between shoulders 20 and 20ª thereon and the respective plates 16 and 17 and act to hold the brake band outwardly thus reducing the normal friction between the latter and the brake drum.

The pins 3ª and 2ª being slidable as well as pivotal in the brackets 1ᵇ and 1ª respectively, the connections thereby provided with the ends of the brake band are not rigid, provide a lost motion and permit said band to wrap around the brake drum instead of suddenly grip it as would otherwise be the case.

It will be obvious that the foregoing brake mechanism may be simply and economically manufactured and conveniently installed and efficiently operated.

I am aware that many changes may be made and numerous details of construction may be varied through a wide range without departing from the principles of this invention and I therefore do not purpose limiting the patent granted hereon otherwise than necessitated by the prior art.

I claim as my invention:

1. In a brake mechanism, a brake band having spaced guides on the periphery thereof, an offset bar extending across a portion of said band and projecting through said guides, and yieldable means associated with said bar and tending to force said band outwardly.

2. In a brake mechanism for a vehicle a substantially circular brake band, a pair of spaced plates secured on said band and extending laterally thereof, each of said plates having a guide slot therein, a bar extending across the periphery of said band with the ends thereof extending slidably through said slots, and means for securing said bar to said vehicle.

3. In a brake mechanism, a brake band, a pair of spaced guide members thereon, a bar disposed transversely to the periphery of said band and engaging said guide members, said bar having reduced portions adjacent the ends thereof, and yieldable means associated with said portions to normally urge said brake band outwardly.

4. In a brake mechanism, a disc, a brake band disposed around said disc, means for actuating said band, and means for preventing lateral movement of said band, said means comprising a pair of spaced guides on said band, a bar secured to said disc at a point offset from the diameter of said disc, said bar having reduced end portions to define shoulders, said portions engaging said guides, and resilient means disposed between said guides and said shoulders to normally urge said band outwardly.

In testimony whereof I have hereunto subscribed my name.

DELBERT R. CAPES.